United States Patent [19]

Von Allowerden

[11] Patent Number: 4,996,833

[45] Date of Patent: Mar. 5, 1991

[54] FOLDABLE HAYMAKING MACHINE HAVING A PLURALITY OF ROTORS

[75] Inventor: Wilhelm Von Allowerden, Gailingen, Fed. Rep. of Germany

[73] Assignee: Kuhn S.A., Saverne, France

[21] Appl. No.: 485,651

[22] Filed: Feb. 27, 1990

[30] Foreign Application Priority Data

Mar. 1, 1989 [FR] France .................................. 8 902875

[51] Int. Cl.⁵ .............................................. A01D 78/10
[52] U.S. Cl. ........................................ 56/367; 56/380; 56/385
[58] Field of Search ................. 56/372, 366, 367, 374, 56/380, 385, 370; 172/311

[56] References Cited

U.S. PATENT DOCUMENTS

| | | | |
|---|---|---|---|
| 3,948,327 | 4/1976 | Parker et al. | 172/311 |
| 4,133,391 | 1/1979 | Richardson et al. | 172/311 |
| 4,178,998 | 12/1979 | Rockwell | 172/311 |
| 4,184,314 | 1/1980 | Hobbs | 56/372 |
| 4,204,575 | 5/1980 | Richardson et al. | 172/311 |
| 4,206,816 | 6/1980 | Richardson et al. | 172/311 |
| 4,512,416 | 4/1985 | Smith | 172/311 |
| 4,615,397 | 10/1986 | Hastings | 172/776 |
| 4,723,402 | 2/1988 | Webster et al. | 56/377 |
| 4,723,404 | 2/1988 | Aron | 56/370 |

FOREIGN PATENT DOCUMENTS

| | | |
|---|---|---|
| 0270052 | 6/1988 | European Pat. Off. . |
| 0296666 | 12/1988 | European Pat. Off. . |
| 0300937 | 1/1989 | European Pat. Off. . |
| 2654643 | 6/1978 | Fed. Rep. of Germany . |
| 2057239 | 4/1981 | United Kingdom . |

*Primary Examiner*—Ramon S. Britts
*Assistant Examiner*—Terry Lee Melius
*Attorney, Agent, or Firm*—Oblon, Spivak, McClelland, Maier & Neustadt

[57] ABSTRACT

This invention relates to a haymaking machine comprising several tedding and/or windrowing rotors which are connected to a carrying frame having a central section and side sections which are connected to one another. According to the invention, each side section includes three parts each carrying a rotor, and which are connected to one another by pins oriented in the direction of advance of the machine. Each of these parts is movable by an angle of about 90° around a hinge pin with a central section or an adjacent part, so that they may be folded approximately in the shape of an upside-down U.

10 Claims, 2 Drawing Sheets

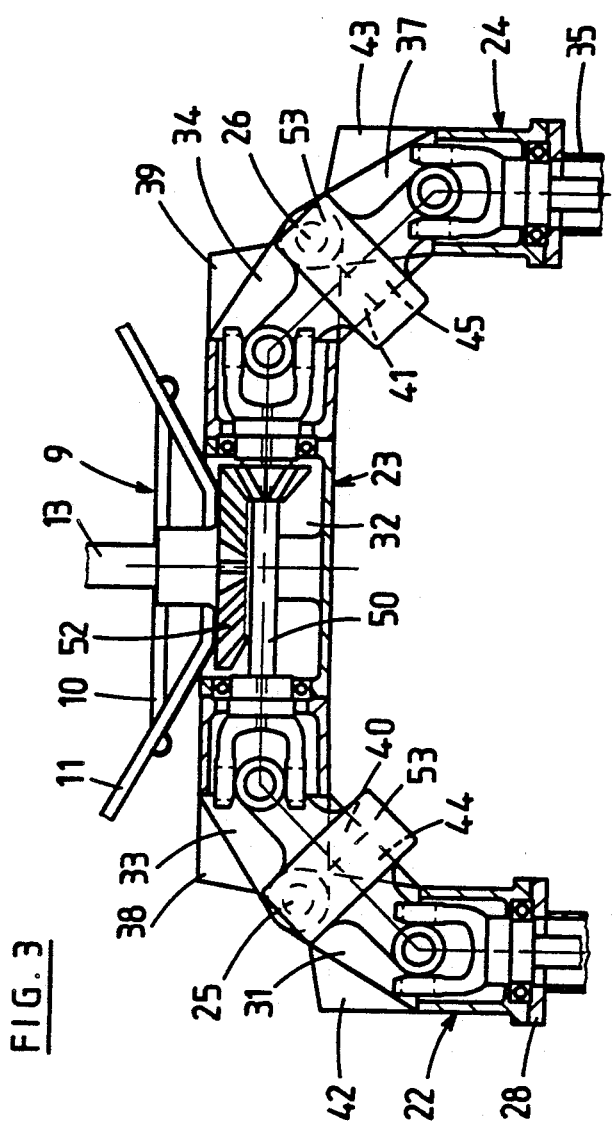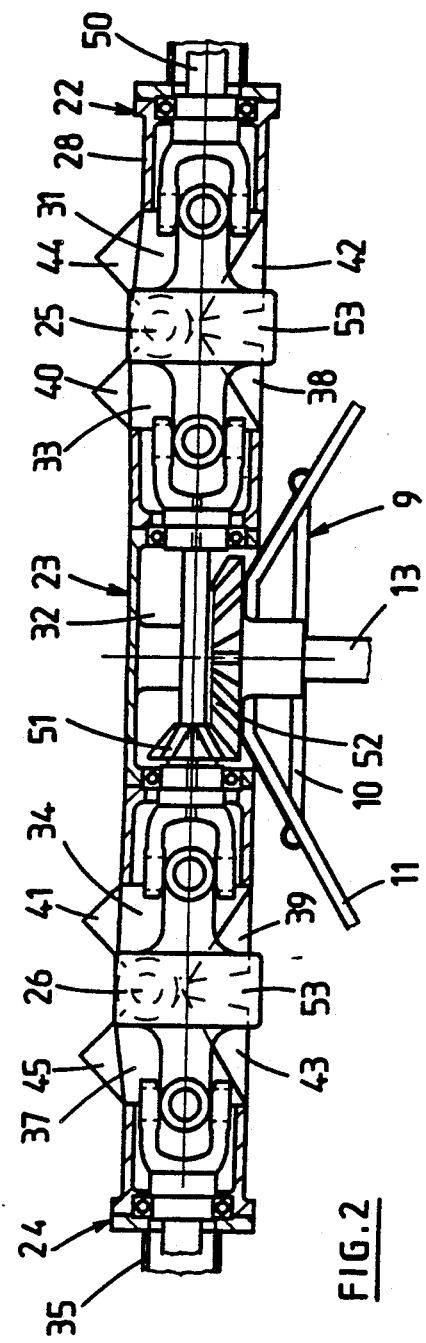

4,996,833

FOLDABLE HAYMAKING MACHINE HAVING A PLURALITY OF ROTORS

BACKGROUND OF THE INVENTION

1. Field of the Invention

This invention relates to a haymaking machine comprising several tedding and/or windrowing rotors which are connected to a carrying frame consisting of a central section and side sections placed on both sides of the central section, the sections being connected to one another by swivel pins oriented in the direction of advance and around which the side sections can be moved for transport. The rotors are rotatably driven during operation by drive shafts which are housed in the sections that constitute the frame and which are connected to one another by couplings located close to the swivel pins between the sections.

2. Discussion of the Background

A machine of this general type is shown in French patent application 2.604.331. This machine comprises a total of six rotors. The central section of its frame carries two rotors, whereas each side section is formed in two parts connected to one another and each carrying a rotor. For transport, the side sections are folded upward to reduce the width of the machine. Moreover, the outside parts of the side sections are directed to the center of the machine to reduce its height.

The working width of such a machine is defined by the widths of each of the working zones of its rotors. Now, insofar as the widths of these zones can be increased very little if good work quality is desired to be maintained, this machine does not make it possible to reach the outputs sought in large farms.

SUMMARY OF THE INVENTION

The purpose of this invention is, in particular, to propose a haymaking machine having a larger working width than is conventionally possible and whose general overall dimensions can be reduced, nevertheless, so that it can be transported easily on the roads.

For this purpose, a significant characteristic of the present invention consists of each side section of the frame of the machine comprising three parts, each carrying at least one rotor, these parts being connected to one another by pins oriented in the direction of advance and each of these parts being movable by an angle of about 90° around its hinge pin with the adjacent part or the central section so that they may be folded so as to be in the shape of an inverted U.

Thanks to this arrangement, the machine can comprise eight rotors. It thus is possible to provide a working width which is clearly greater than that of the known machine while obtaining practically identical general overall dimensions in a transport position.

Another characteristic of the present invention is that it uses a machine which has hydraulic cylinders assuring both the folding and lifting of the side sections. Each of these cylinders is connected to the central section of the frame and to two connecting rods, the first connecting rod being connected to the inside part and the second to the outside part of the corresponding side section, the second connecting rod forming, in a working position, an angle with the corresponding hydraulic cylinder which is larger than the angle that the first connecting rod forms with the cylinder.

Thanks to this arrangement, when the machine is moved from a working position to a transport position, each hydraulic cylinder first assures the approximately inverted U-shaped folding of the different parts of the corresponding side section. Then, it moves all these parts upward relative to the central section in a transport position. Conversely, to pass again to a working position, the cylinders first move the side sections downward. Then, they bring about unfolding of the intermediate and outside parts of each side section.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 shows, on a larger scale, a view at the level of the intermediate part of a side section of the frame of the machine in a working position;

FIG. 3 shows a view similar to that of FIG. 2 when the side section is in a transport position.

DESCRIPTION OF THE PREFERRED EMBODIMENTS

Figure 1:
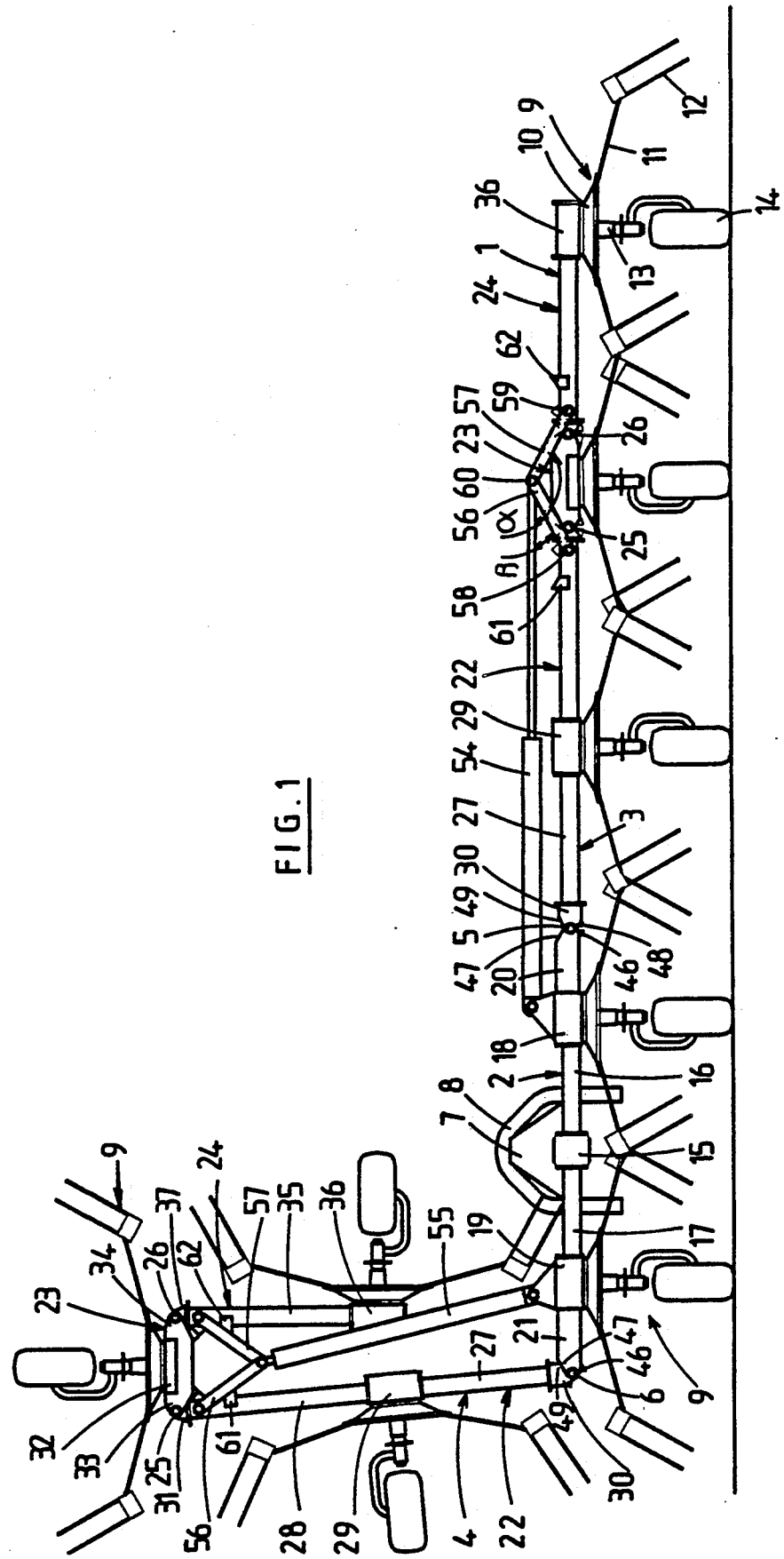
FIG. 1 shows a rear view of a machine according to the present invention, with one half being in a working position and the other half being in a transport and/or removal position.

The haymaking machine shown in FIG. 1 comprises a frame (1) consisting of a central section (2) and two side sections (3, 4). These side sections (3, 4) are located on both sides of central section (2) and are connected to this section by pins (5, 6) oriented in the direction of advance of the machine. A carrying beam (7), which also is oriented in the direction of advance, is connected to the central section (2). This beam (7) is equipped at its front end with a bracket (8) which makes possible the coupling of the machine to the three-point lifting device of the tractor used to drive the machine.

In the example shown, the machine comprises eight rotors (9) located under the frame (1). Each of these rotors (9) consists of a hub (10) to which several arms (11), carrying work forks or members (12) at their outside ends, are attached which overlap with adjacent work forks or other members in working operation. Each hub (10) is mounted so as to be able to turn on a stationary support pin (13) approximately vertical or inclined in the direction of advance of the machine. These pins (13) are attached to the frame (1) and carry small wheels (14) at their lower ends, making it possible to move the machine on the ground during working operation.

Central section (2) of frame (1) of the machine in particular includes a housing (15), two pipes (16, 17) and two casings (18, 19). Each of these pipes (16, 17) is connected at one of its ends to a housing (15) and at its other end to one of the casings (18, 19). A rotor (9) is placed under each casing (18, 19). Central section (2) thus carries two rotors (9). Each of the casings (18, 19) also comprises brackets (20 and 21) with housings for hinge pins (5, 6) of the side sections (3 and 4) on the side opposite to that on which the corresponding pipe (16, 17) is located.

Each side section (3, 4) includes three parts (22, 23, 24) each carrying at least one rotor (9). These three parts (22, 23, 24) of each side section (3, 4) are connected to one another by pins (25, 26) oriented in the direction of advance of the machine. They are movable by angles of substantially 90° around the pins (25 and 26), so that they can be folded to form in combination an inverted U-shaped structure. Inside part (22) of each side section (3, 4) in particular comprises two pipes (27, 28) and a casing (29), under which a rotor (9) is located. A first pipe (27) comprises brackets (30) with housings for one hinge pin (5, 6) at one end thereof and which carries a casing (29) at a second end. A second pipe (28) is attached at one end thereof to the casing (29) and has brackets (31) at a second end thereof with housings for a hinge pin (25) of an intermediate part (23) of side section (3, 4).

The intermediate part (23) has very small dimensions. It essentially comprises a casing (32) with a rotor (9), the casing being equipped with brackets (33, 34), which have housings for hinge pins (25, 26), on opposite sides thereof. An outside part (24) of each side section (3, 4) includes a pipe (35) carrying a casing (36) with a rotor (9) at a first end thereof and brackets (37) with housings for hinge pin (26) at a second end thereof.

At each of its ends, the intermediate part (23) of each side section (3, 4) comprises at least one stop (38, 39) directed downward (i.e. toward the ground, when the machine is in a working position) and at least one stop (40, 41) directed upward. Likewise, the inside part (22) and outside part (24) each comprise at least one stop (42, 43) directed downward and at least one stop (44, 45) directed upward at its end connected to the intermediate part (23). These stops (42 to 45) work with abovementioned stops (38 to 41) of the intermediate part (23) to limit pivoting between the different parts which comprise the side sections (3, 4). At the two ends of central section (2) and at the ends of inside parts (22) of side sections (3, 4), which are connected to said central section, stops (46 to 49) also are provided to limit the downward and upward movements around hinge pins (5 and 6).

Various rotors (9) can be rotationally driven around their support pins (13) by drive shafts (50) housed in sections (2, 3 and 4). Positioned at the same level as each casing (18, 19, 20, 32 and 36), these drive shafts (50) each comprise a driving pinion (51) which engages with a ring (52) integral with a corresponding rotor (9). On the other hand, at the same level as each connection between sections (2, 3 and 4) and between different parts (22, 23 and 24) composing side sections (3 and 4), the drive shafts (50) are coupled to one another by double universal joints (53) (see FIGS. 2 and 3). Other types of couplings which make movements of at least 90° possible between drive shafts (50) also could be used.

Drive shaft (50), which is housed in the central section (2), extends through housing (15). Inside the latter, the drive shaft comprises a driving pinion which is meshed with another pinion integral with a shaft which extends outside of housing (15), on the front side of the machine. This shaft can be connected to a power takeoff shaft of the drive tractor by a cardan shaft.

It also is evident from FIG. 1 that the machine comprises two hydraulic cylinders (54 and 55) to move the three parts (22, 23 and 24) of the side sections (3, 4). These cylinders (54 and 55) are located above the frame (1), but slightly to the rear relative to sections (2, 3 and 4). Each of these cylinders (54, 55) is connected to the central section (2) and to two connecting rods (56, 57) which are approximately of the same length. The first connecting rod (56) is connected to the inside part (22) by a pivot member (58) and the second connecting rod (57) is connected with a pivot member (59) to the outside part (24) of the corresponding side section (3 or 4).

In a stored or transport position, these two connecting rods (56, 57) are positioned in the shape of a V while in a working position, the second connecting rod (57) forms an angle ($\alpha$) with the corresponding hydraulic cylinder (54 or 55) which is larger than an angle ($\beta$) which first connecting rod (56) forms with the cylinder. Further, these two connecting rods (56, 57) are connected to their hydraulic cylinder (54 or 55) by a hinge pin (60). In the working position, the axis of hinge pin (60) is located above the intermediate part (23) of the corresponding side section (3 or 4).

According to an alternate embodiment (not shown), the two connecting rods (57) can comprise an oblong hole through which pivot (59), integral with outside part (24) of corresponding side section (3, 4), passes. Each outside part (24) then can move a certain angle relative to intermediate part (23) to follow the unevenness of the ground better.

On the other hand, the inside part (22) and outside part (24) of each side section (3 or 4) each comprise a stop (61, 62). The latter are placed against the connecting rods (56 and 57) in a transport position to better define this position.

In a working position, as shown on the right side of the machine in FIG. 1, all rotors (9) are approximately aligned and are at ground level. They then can be rotationally driven around their support pins (13), so that they turn two by two in forward convergence—as seen in the direction of advance of the machine. As a result of this rotation, their forks (12) move the hay which is on the ground and assure tedding of excellent quality. It is evident that the rotors are intended to windrow the hay or else rotors making it possible to perform the tedding and windrowing also could be equipped on this machine.

For the transport and/or the removal of the machine, the two side sections (3, 4) are folded and are moved upward, around hinge pins (5, 6), in the position shown on the left half of the machine in FIG. 1 and in FIG. 3. This folding operation is performed by the hydraulic cylinders (54, 55) which can be controlled from the drive tractor. When these cylinders (54, 55) are retracted, they first exert traction on the outside part (24) of the side sections (3, 4). This stems from the fact that at the beginning of this operation, the second connecting rod (57) immediately pulls on the outside part (24), while the first connecting rod (56) simply pivots around its joint (58) on the inside part (22).

The outside part (24) of each section (3, 4) then is moved upward around its hinge pin (26). When this movement reaches about 90°, a stop (45) comes into contact with a stop (41) of corresponding intermediate part (23). Then, the two parts (24 and 23) pivot together around hinge pin (25) of the inside part (22) until the stop (40) of the intermediate part (23) meets the stop (44) of the inside part. At this stage, the intermediate part (23) also has pivoted about 90°, so that three parts (22, 23 and 24) are folded so as to be substantially in the shape of an inverted U with respect to the ground. Then, operation of cylinders (54 and 55) makes the three parts (22, 23 and 24) of each side section (3, 4) pivot upward together, around the hinge pins (5, 6) of the central section (2). This pivoting upward is limited by stops (47 and 49) provided, on one hand, on the central section (2) and, on the other hand, on the inside parts (22). The three parts (22, 23 and 24) of each side section (3 or 4) have been moved by an angle of about 90° so that they form an inverted U. In this position, rotor (9) of each inside part (22) is directed outward, each intermediate central part (23) is directed upward and each outside part (24) is directed towards the center of the machine. The overall dimension of the machine then is relatively very small, so that it can be transported on roads and occupies only a small space when put away during the period when it is not used. A mechanical locking device optionally can be provided to lock the side sections in this position.

On the other hand, since the angles between different parts (e.g. 2, 22, 23 and 24) which are folded are only on the order of 90°, the joints (53) between the drive shafts (50), which assure the rotational driving of the rotors (9), are able to turn without risk of breaking. Thus, it is not necessary to stop driving of rotors (9) before each movement of the side sections (3 and 4).

To return to a working position, the hydraulic cylinders (54 and 55) are operated so that they are extended. They then move the three parts (22, 23 and 24) of each side section (3, 4) downward, around the hinge pins (5, 6) of the central section (2). Then, as soon as the rotor (9) of each inside part (22) touches the ground, each intermediate part (23) pivots around its hinge pin (25), until its rotor (9) touches the ground. Finally, in a last step, each outside part (24) moves around its hinge pin (26), until its rotor (9) also touches the ground. In this new position, all rotors (9) again are aligned for working operation.

It is quite evident that the invention is not limited to the embodiment described and shown in the accompanying drawings. Modifications are possible, in particular relative to the composition of various elements, or by substitution of equivalent techniques, without thereby going outside the field of protection.

What is claimed as new and desired to be secured by letters of the United States is:

1. A haymaking machine which comprises:
    a carrying frame which includes a central section and side sections placed on opposite sides of said central section, said central and side sections being connected to one another by swivel pins oriented in a direction of advance of said machine in working operation and about which the side sections can be pivoted for transport;
    a plurality of rotors, having adjacent work members which overlap in working operation, which are connected to said carrying frame;
    means mounted on said frame for rotatably driving said rotors during working operation and which includes drive shafts housed in said sections of said frame and which are connected to one another by couplings located in proximity with said swivel pins wherein each side section of said frame comprises three frame parts, each frame part carrying at least one rotor, a hinge pin member connecting said frame parts to one another and wherein said hinge members are oriented in a direction of advance of said frame in working operation; and
    means for pivoting each of said frame parts by an angle of substantially 90° around said hinge pins with an adjacent frame part and pivoting each side section about said central section so that said frame parts are foldable so as to be approximately in the shape of an inverted U.

2. A machine according to claim 1, wherein an intermediate frame part of each of the side sections comprises a casing carrying one of said rotors and a connecting bracket positioned on each side of said casing.

3. A machine according to claim 1, wherein an intermediate frame part of each of said side sections comprises stop members and each of two remaining frame parts comprise stop members for limiting the degree of pivoting around their hinge pin members.

4. A machine according to claim 1, which comprises first and second hydraulic cylinders connected to said frame parts for holding the frame parts in the shape of an inverted U in a stored position and for unfolding the frame parts in a working position.

5. A machine according to claim 4, wherein each of said hydraulic cylinders is connected to said central section and to first and second connecting rods mounted on each side section, the first connecting rod being connected to an inside frame part and the second connecting rod being connected to an outside frame part of each side section.

6. A machine according to claim 5, wherein in working operation, said second connecting rod forms an angle with a corresponding one of said hydraulic cylinders, which is larger than angle ($\beta$) formed between said first connecting rod and said cylinder.

7. A machine according to claim 5, wherein in working operation, a connecting point between each of said hydraulic cylinders and said first and second connecting rods is located above an intermediate frame part of a corresponding one of said side sections.

8. A machine according to claim 5, wherein in a transport position the connecting rods form a V with one another.

9. A machine according to claim 5, wherein one of the connecting rods which is connected to an outside frame part of each side section has an oblong hole formed therein within which a pivot member, integral with said outside frame part, is engaged.

10. A machine according to claim 5, wherein an inside frame part and an outside frame part of each side section include stop members which contact so as to define a transport position of said carry frame in combination with said connecting rods.

* * * * *

UNITED STATES PATENT AND TRADEMARK OFFICE
CERTIFICATE OF CORRECTION

PATENT NO. : 4,996,833

DATED : March 5, 1991

INVENTOR(S) : Wilhem Von Allwoerden

It is certified that error appears in the above-identified patent and that said Letters Patent is hereby corrected as shown below:

On the title page, under item [19] and in item [75], "Von Alloweden" should be --Von Allwoerden--.

Signed and Sealed this

Twentieth Day of October, 1992

Attest:

DOUGLAS B. COMER

*Attesting Officer*      *Acting Commissioner of Patents and Trademarks*